(12) United States Patent
Yang et al.

(10) Patent No.: US 12,135,870 B2
(45) Date of Patent: Nov. 5, 2024

(54) INPUT CONTROL METHOD, DEVICE, AND ELECTRONIC APPARATUS FOR INPUT THROUGH EXTERNAL DEVICE

(71) Applicant: Lenovo (Beijing) Limited, Beijing (CN)

(72) Inventors: Yunlong Yang, Beijing (CN); Maoshan Jiang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/147,624

(22) Filed: Dec. 28, 2022

(65) Prior Publication Data

US 2023/0214110 A1  Jul. 6, 2023

(30) Foreign Application Priority Data

Dec. 31, 2021  (CN) .......................... 202111673869.9

(51) Int. Cl.
*G06F 3/01*  (2006.01)
*G06F 3/023*  (2006.01)
*G06F 3/0487*  (2013.01)
G06F 1/16  (2006.01)
G06F 1/3206  (2019.01)
G06F 1/3234  (2019.01)
G06F 1/3287  (2019.01)
G06F 3/02  (2006.01)
G06F 3/04815  (2022.01)
G06F 3/04842  (2022.01)

(52) U.S. Cl.
CPC .......... *G06F 3/0487* (2013.01); *G06F 3/0236* (2013.01); *G06F 1/163* (2013.01); *G06F 1/1686* (2013.01); *G06F 1/3206* (2013.01); *G06F 1/3278* (2013.01); *G06F 1/3287* (2013.01); *G06F 3/011* (2013.01); *G06F 3/0227* (2013.01); *G06F 3/04815* (2013.01); *G06F 3/04842* (2013.01)

(58) Field of Classification Search
CPC ...... G06F 3/011; G06F 3/0227; G06F 3/0236; G06F 3/04815; G06F 3/04842; G06F 3/0487; G06F 1/163; G06F 1/1686; G06F 1/3206; G06F 1/3278; G06F 1/3287
See application file for complete search history.

(56) References Cited

U.S. PATENT DOCUMENTS

| | | | |
|---|---|---|---|
| 11,087,029 B1 * | 8/2021 | Satpathy | G06F 21/75 |
| 2015/0130688 A1 * | 5/2015 | Li | G02B 27/017 345/8 |
| 2017/0308258 A1 * | 10/2017 | Xu | G06F 3/0488 |
| 2018/0336332 A1 * | 11/2018 | Singh | G06F 3/011 |

* cited by examiner

*Primary Examiner* — Adam J Snyder
(74) *Attorney, Agent, or Firm* — ANOVA LAW GROUP, PLLC

(57) ABSTRACT

An input control method includes, in response to entering a first state, turning on a first mode, the first state being a state requiring input, and receiving first data sent by a first apparatus, the first data being data associated with the first mode.

16 Claims, 4 Drawing Sheets

INPUT CONTROL METHOD, DEVICE, AND ELECTRONIC APPARATUS FOR INPUT THROUGH EXTERNAL DEVICE

CROSS-REFERENCE TO RELATED APPLICATION

This application claims priority to Chinese Patent Application No. 202111673869.9, filed on Dec. 31, 2021, the entire content of which is incorporated herein by reference.

TECHNICAL FIELD

The present disclosure generally relates to the control technology and, more particularly, to an input control method, device, and electronic apparatus.

BACKGROUND

Currently, an augmented reality (AR) apparatus and a virtual reality (VR) apparatus usually use a virtual keyboard for input, which has low operation efficiency and poor user experience.

SUMMARY

Embodiments of the present disclosure provide an input control method. The method includes, in response to entering a first state, turning on a first mode, and receiving first data sent by a first apparatus, The first state is a state requiring input. The first data is data associated with the first mode.

Embodiments of the present disclosure provide an input control device, including a mode start module and a data reception module. The mode start module is configured to turn on a first mode in response to entering a first state. The first state is a state requiring input. The data reception module is configured to receive first data sent by a first apparatus. The first data is data associated with the first mode.

Embodiments of the present disclosure provide an electronic apparatus, including a memory and a processor. The memory stores executable instructions. The processor is coupled with the memory and, when the instructions are executed, configured to, in response to entering a first state, turn on a first mode, and receive first data sent by a first apparatus, The first state is a state requiring input. The first data is data associated with the first mode.

In the technical solutions, compared with the existing technology, embodiments of the present disclosure provide an input control method, a device, and an electronic apparatus. The method includes, in response to entering the first state, turning on the first mode. The first state is the state requiring input. The method further includes receiving the first data sent by the first apparatus. The first data is the data associated with the first mode. In the solution, when the text input is required, the text input is not performed locally. The text data to be inputted may be obtained from the first apparatus. Thus, when the current apparatus is inconvenient to perform the text input, the user can use the first apparatus to perform the text input. After performing the text input, the local apparatus may obtain the required text data from the first apparatus. With the solution, the problem of inconvenient input in some apparatuses that are inconvenient to perform text input operations may be solved. The user experience may be improved.

DETAILED DESCRIPTION OF THE EMBODIMENTS

The technical solutions of embodiments of the present disclosure are described in detail below in connection with the accompanying drawings of embodiments of the present disclosure. Apparently, described embodiments are only some embodiments of the present disclosure, not all embodiments. Based on embodiments of the present disclosure, all other embodiments obtained by those of ordinary skill in the art without creative efforts shall fall within the scope of the present disclosure.

Figure 1:
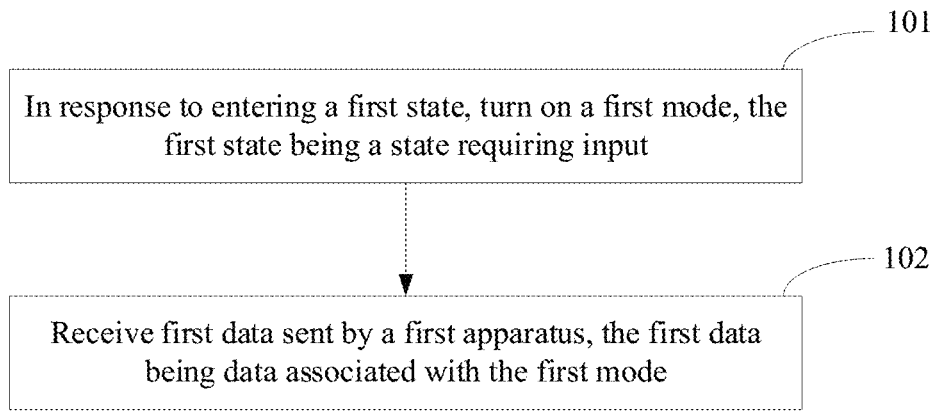
FIG. 1 illustrates a schematic flowchart of an input control method according to embodiments of the present disclosure.

FIG. 1 illustrates a schematic flowchart of an input control method according to embodiments of the present disclosure. As shown in FIG. 1, the input control method includes the following processes.

At 101, in response to entering a first state, a first mode is turned on. The first state is a state requiring input.

The input control method may be applied to various types of electronic apparatuses, which are not limited by embodiments of the present disclosure. The input control method may solve the problem of inconvenient text input for electronic apparatuses. For example, for some wearable apparatuses, such as a virtual reality (VR) apparatus or an augmented reality (AR) apparatus, since the apparatuses are worn by a user on the head, when text input is required, the user usually may need to keep moving the head to select an input character and confirm the selection. The input process may be slow, and the user may easily feel tired. Therefore, for these electronic apparatuses that are inconvenient for text input, the present disclosure provides a solution to realize convenient and efficient text input. The wearable apparatus may be used as an example of an execution body for the input control method of the present disclosure for description to facilitate understanding.

The first mode may be a mode indicating that a system activates a certain function or a mode indicating different operation states of a certain function. Different implementations of the first mode may be described in detail below and are not described here.

At 102, first data sent by a first apparatus is received. The first data is data associated with the first mode.

After the first mode is turned on, the system may trigger the first apparatus to obtain the first data and transmit the obtained first data to the system. The first data may be text content that needs to be input. The first data may be obtained by the user performing input through an input interface including a virtual keyboard. That is, the first data may be the data received by the first apparatus from an input device of the first apparatus. In some embodiments, the input device of the first apparatus may be a physical input device or a virtual input device. After the system receives the first data, a corresponding text input operation may be realized.

Different implementations may exist for the system to trigger the first apparatus to obtain the first data. For example, after turning on the first mode, the system may send an instruction to the first apparatus to instruct the first apparatus to obtain the first data. In some other embodiments, after turning on the first mode, the system may send some data contents to the first apparatus. Thus, after performing parsing and recognition on the data contents, the first apparatus may directly enter a page of obtaining the first data.

The first data may be associated with the first mode, which means that after entering the first mode, the first apparatus can enter a condition of obtaining the first data.

The first apparatus may include an electronic apparatus such as a mobile phone, a PAD, a tablet computer, a notebook computer, etc., as long as the device can conveniently perform text input through an input device such as a hand or a stylus pen. The first apparatus and the execution body of the input control method of the present disclosure may be connected in a plurality of manners for data exchange. The first apparatus and the execution body may be connected and matched not limited to any one of Bluetooth, network, and physical connection.

In the input control method of embodiments of the present disclosure, when the text input needs to be performed, the text input may not be performed locally, but the text data that needs to be input may be obtained from the first apparatus. Thus, when the current apparatus is inconvenient for text input, the user may perform text input through the first apparatus. Then, the local apparatus may obtain the required text data from the first apparatus. With this implementation, the problem of inconvenient input in some apparatuses that are inconvenient to perform a text input operation may be solved, and the user experience may be improved.

In some embodiments, turning on the first mode in response to entering the first state may include, in response to entering the first state, turning on an image capture mode to obtain and output the first display information of the first apparatus. The first display information may at least include an input interface of the first apparatus.

In some embodiments, since the user wears the wearable apparatus on the head, such as the VR apparatus, the user cannot see an external environment. Thus, even if the first apparatus can be configured to perform the text input conveniently, the user cannot see the first apparatus. Therefore, in some embodiments, a camera of the wearable apparatus may be configured to collect and obtain an image in a certain area in front of a user face. When the user handhelds and places the first apparatus in front of the user. The wearable apparatus may collect an image of the first apparatus, including a display of the first apparatus or a physical input device of the first apparatus. The first display information may be the input interface of the first apparatus. That is, as long as the first display information includes content that satisfies the user to perform the text input, for example, a text input window or a virtual keyboard.

After the image of the first apparatus is obtained, that is, after the first display information is obtained, the first display information may be directly controlled and output in the display area. Thus, the user may see the image of the first apparatus in front of the user and perform the text input on the first apparatus by controlling the fingers. The camera of the wearable apparatus may be used as an eye for the user to see the external environment. Thus, the user may perform the text input on the external first apparatus when using the wearable apparatus on the head.

In some other embodiments, turning on the first mode in response to entering the first state may include, in response to entering the first state, turning on a screen unshielded mode to cause no content to be output on the display screen.

In some embodiments, the user may wear the wearable apparatus on the head, such as the AR apparatus. Since the screen of the AR apparatus has a certain degree of transparency, when the user wears the AR apparatus, when the screen of the AR apparatus is in the screen unshielded mode, the user can see the external environment through the screen of the AR apparatus.

After the screen unshielded mode is turned on, the user can see the external environment. Thus, the user can see the first apparatus and perform the text input operation on the first apparatus.

The first state may be determined by detecting the output content of the display area, for example, detecting that the display page on the display screen includes a text input window. In some embodiments, the first state may also be determined after a specific input instruction is detected. The specific input instruction may be a voice instruction, such as an audio instruction of "please enter the password" from a speaker. In some embodiments, when the first mode may be entered based on the audio instruction, the display content of the display area may include the text input window or may not include the text input window, which is not limited by the present disclosure.

Based on the above content, when the current display page is detected to include the first object, such as the text input window, entering the first state may be determined. In some other embodiments, when the data input instruction is recognized, such as the audio instruction, entering the first state may be determined.

Figure 2:
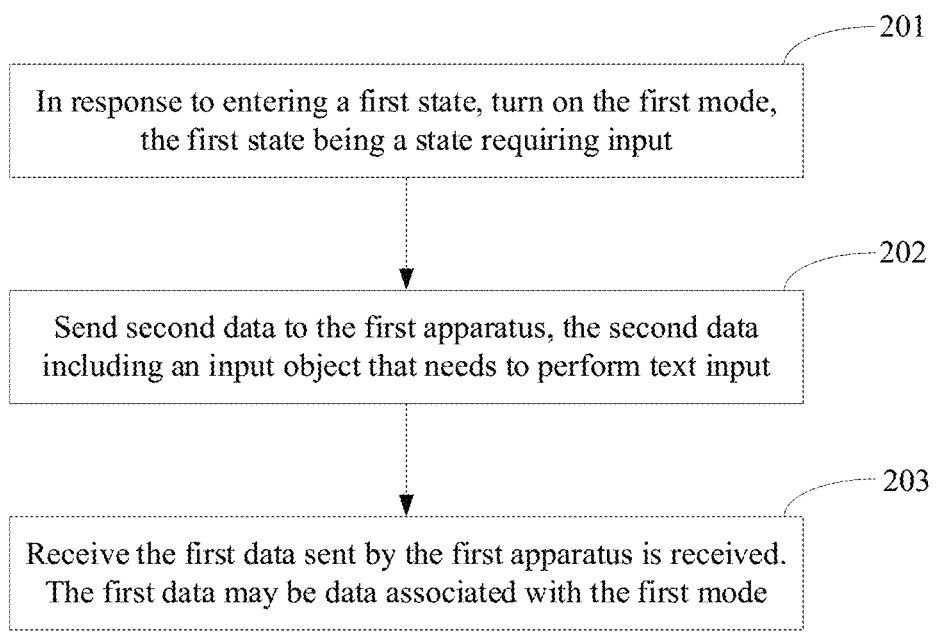
FIG. 2 illustrates a schematic flowchart of another input control method according to embodiments of the present disclosure.

FIG. 2 illustrates a schematic flowchart of another input control method according to embodiments of the present disclosure. As shown in FIG. 2, in some embodiments, the input control method includes the following processes.

At 201, in response to entering a first state, the first mode is turned on. The first state is a state requiring input.

At 202, second data is sent to the first apparatus. The second data includes an input object that needs to perform text input.

The input object that needs to perform the text input may include, but is not limited to, a text input window. When the output page of the wearable apparatus includes an input object that needs to perform the text input, it may indicate that the text input currently needs to be performed. In this case, the input object on the current page may be packaged and sent to the first apparatus. Thus, after parsing and obtaining the input object, the first apparatus may perform the text input to obtain the first data.

At 203, the first data sent by the first apparatus is received. The first data may be data associated with the first mode.

In some embodiments, after entering the first state, the system may package and send the text input object in the current display page to the first apparatus. Thus, after the first apparatus parses and obtains the text input object, the user can conveniently enter text information in the input object. A display effect of the input object on the wearable apparatus side may be the same as the display effect on the first apparatus. Thus, the user may not experience a jumping sense, and the user input experience may be improved.

In some embodiments, in addition to the input object that can perform the text input, the second data may also include a context attribute of the input object. The context attribute may be used to indicate a type of text that needs to be entered in the input object.

Figure 3:
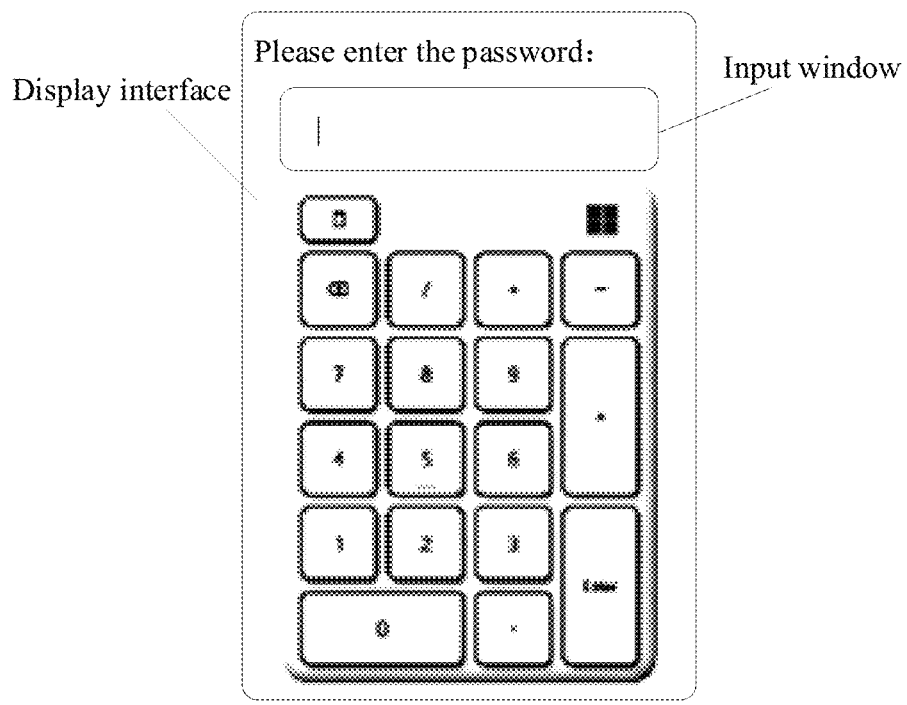
FIG. 3 illustrates a schematic diagram showing a display interface of a first apparatus according to embodiments of the present disclosure.
Figure 4:
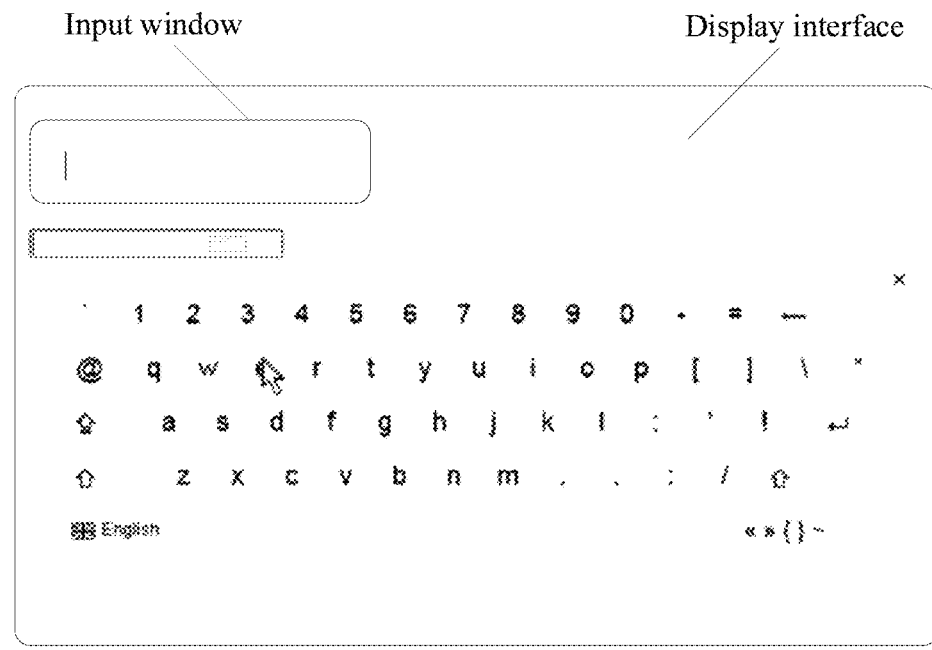
FIG. 4 illustrates a schematic diagram showing another display interface of a first apparatus according to embodiments of the present disclosure.

After receiving the second data, the first apparatus may obtain the original content of the second data through decoding and may further determine which type of text input needs to be performed based on the context attribute. For example, the original content of the context may be "please enter your password." Thus, the context attribute may correspond to character input, and the first apparatus may directly call up a character keyboard for the user to directly perform numeric input on a numeric keyboard. The display interface of the first apparatus is illustrated in FIG. 3. For another example, if the original content of the context is "please answer the preset question," then the context attribute may correspond to the text input. Thus, the first apparatus may call up the virtual keyboard with nine keys of pinyin based on a user habit. The display interface of the first apparatus is shown in FIG. 4.

In some embodiments, in order to prevent the user from feeling disjointed and to prevent the user from forgetting what input needs to be performed after the wearable apparatus enters the first mode, the context attribute may also be the original content of the context. Thus, in addition to displaying the text input window, the first apparatus may display the context to facilitate the user to know what the user needs to enter at any time. As shown in FIG. 3, the display content of the first apparatus further includes "please enter the password" above the text input window. As shown in FIG. 4, the display content of the first apparatus only includes the text input window and the virtual keyboard.

In some embodiments, sending the second data to the first apparatus may include processing the first content in the current display page into encrypted second data and sending the second data to the first apparatus. Then, receiving the first data sent by the first apparatus may include receiving the encrypted first data associated with the input object returned by the first apparatus based on the second data.

In some embodiments, encryption processing may be performed on the second data sent by the wearable apparatus to the first apparatus and the first data returned by the first apparatus, which effectively ensures data security and user privacy. A specific encryption manner and a specific encryption algorithm used between the wearable apparatus and the first apparatus are not limited by the present disclosure, as long as the user application needs can be met.

In addition, if the user enters data with strong privacy such as a password, when the user enters password, real input content may not be displayed in the text input window. A "*" sign may be used instead of the user input content to prevent the password data from being viewed.

Figure 5:
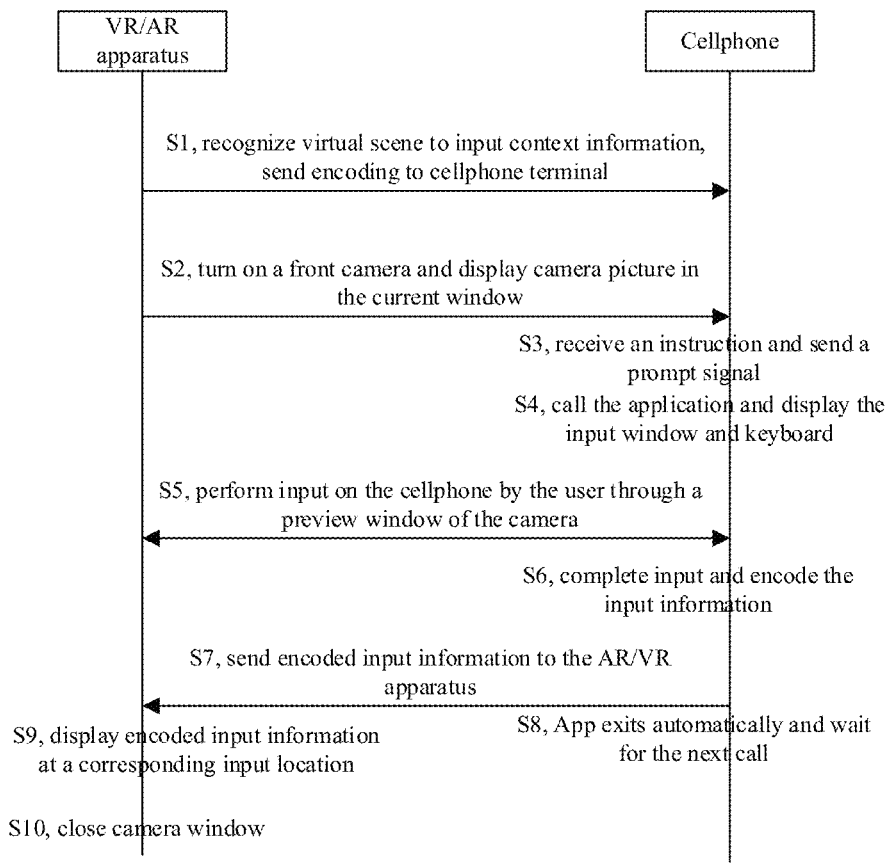
FIG. 5 illustrates a schematic diagram showing an interaction time sequence of an input control method according to embodiments of the present disclosure.

FIG. 5 illustrates a schematic diagram showing an interaction time sequence of an input control method according to embodiments of the present disclosure. With reference to FIG. 5, in some embodiments, an input system module is added to the virtual scene application of the wearable apparatus. The input system module may be configured to recognize the location where the user needs to perform input and the context. For example, a login window may require continuously inputting an account and a password. Through the input system module, the text input location and the context attribute may be packaged by the input system module. Then, the packaged text input location and the context attribute may be sent to a cell phone terminal.

After the cell phone receives the above-packaged content, the input instruction may be considered to be received. Parsing may be performed on the packaged content to obtain the input scene and the context attribute. A corresponding program may be started on the cell phone, and a prompt signal may be issued. For example, the cell phone may issue a prompt voice or vibrate. Then, the input window may be automatically outputted, and the virtual keyboard may be called as described above. In some embodiments, the virtual keyboard and the input window of a corresponding type may be started according to the context attribute. The input window may be an input window that directly displays the input content or an input window that hides the real content and only displays "*" sign.

When the user confirms completion after completing a series of inputs, the input content may be encrypted and transmitted to the input system module of the wearable apparatus. The input system module may perform decryption on the input content. Then, the decrypted input content may be displayed by the corresponding text input object. Then, the camera window of the wearable apparatus may be automatically closed, and the corresponding application on the cellphone terminal may automatically exit, waiting for a next trigger.

The above content describes a specific implementation. The related content described in embodiments of the present disclosure is understood in connection with these content and FIG. 5. Compared with the traditional text input method of the VR apparatus and AR apparatus, with the technical solution of the present disclosure, the efficiency and fluency of user input may be significantly improved. Through the camera window, the user can operate the first apparatus such as the cellphone without additional operations such as taking off the wearable apparatus. The user may conveniently use the apparatus and have high satisfaction.

For a simple description of method embodiments of the present disclosure, the method may be described as a series of action combinations. However, those skilled in the art should know that the present disclosure is not limited by the described action sequence, because certain steps may be performed in another sequence or simultaneously according to the present disclosure. Then, those skilled in the art should also know that embodiments described in the specification may be some embodiments of the present disclosure. The involved actions and modules may not be necessarily required by the present disclosure.

In embodiments of the present disclosure, the method may be described in detail. The method of the present disclosure may be implemented by various forms of apparatuses. Therefore, the present disclosure may further provide a device. Specific embodiments are given below for a detailed description.

Figure 6:
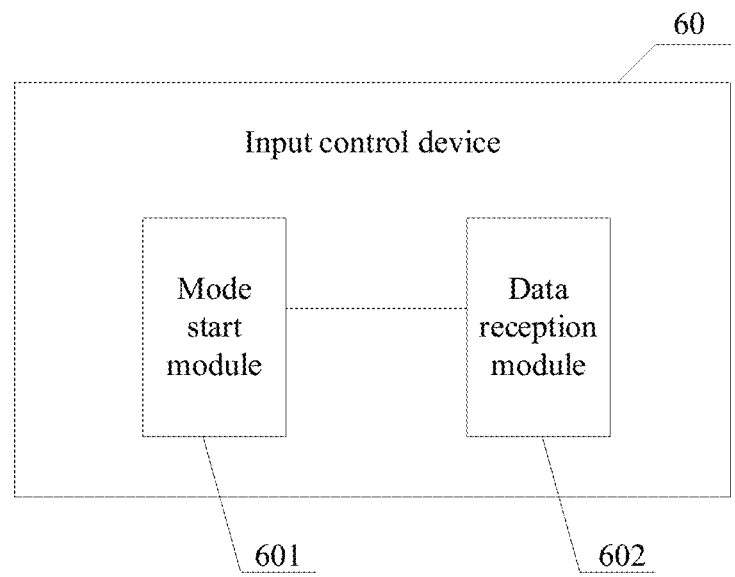
FIG. 6 illustrates a schematic structural diagram of an input control device according to embodiments of the present disclosure.

FIG. 6 illustrates a schematic structural diagram of an input control device according to embodiments of the present disclosure. As shown in FIG. 6, the input control device 60 includes a mode start module 601 and a data reception module 602. The mode start module 601 may be configured to, in response to entering the first state, start the first mode. The first state may be a state that requires input.

The data reception module 602 may be configured to receive the first data sent by the first apparatus, where the first data is data associated with the first mode.

In the input control device of embodiments of the present disclosure, when the text input needs to be performed, the text input may not be performed locally, but the text data that needs to be inputted may be obtained from the first apparatus. Thus, when the current apparatus performs the text input inconveniently, the user may perform the text input through the first apparatus. Then, the local apparatus may obtain the required text data from the first apparatus. The problem of inconvenient text input for the electronic apparatuses that perform the text input inconveniently. The user experience may be improved.

In some embodiments, the mode start module may be configured to, in response to entering the first state, start the image acquisition mode to obtain and output the first display information of the first apparatus. The first display information may at least include the input interface of the first apparatus.

In some embodiments, the mode start module may be configured to, in response to entering the first state, start the screen unshielded mode to cause no content to be output on the display screen.

In some embodiments, the input control device may further include a state detection module. The state detection module may be configured to determine that the apparatus enters the first state when the current display page is detected to include the first object or determine that the apparatus enters the first state when the data input instruction is recognized.

In some embodiments, the input control device may further include a data transmission module. The data transmission module may be configured to send the second data to the first apparatus before the data reception module receives the first data sent by the first apparatus. The second data may include the input object that needs to perform the text input.

In some embodiments, the second data may further include the context attribute of the input object. The context attribute may be used to indicate the type of text that needs to be inputted by the input object.

In some embodiments, the data transmission module may be configured to process the first content of the current display page into the encrypted second data and send the encrypted second data to the first apparatus. Then, the data reception module may be configured to receive the encrypted first data associated with the input object returned by the first apparatus based on the second data.

In some embodiments, the first data may be the data that is inputted by triggering the input device of the first apparatus received by the first apparatus.

Any one of the input control devices of embodiments of the present disclosure may include a processor and a memory. The mode start module, data reception module, state detection module, data transmission module, etc., may be used as program modules to be stored in the memory. The program modules stored in the memory may be executed by the processor to cause the processor to perform the corresponding functions.

The processor may include a core. The core may call the corresponding program module from the memory. One or more cores may be arranged. The return data may be processed by adjusting the parameters of the core.

The memory may include non-persistent memory random access memory (RAM), and/or non-volatile memory of computer-readable media, such as read-only memory (ROM) or flash memory (flash RAM). The memory may include at least one memory chip.

In an exemplary embodiment, a computer-readable storage medium may also be provided, which can be directly loaded into the internal memory of the computer. The computer-readable storage medium may include software codes. After the computer program is loaded and executed by the computer, the processes of the input control method of any embodiment above may be implemented.

In an exemplary embodiment, a computer program product may also be provided, which can be directly loaded into the internal memory of a computer and includes software codes. After the computer program is loaded and executed by the computer, the processes of the input control method of any embodiment above may be implemented.

Figure 7:
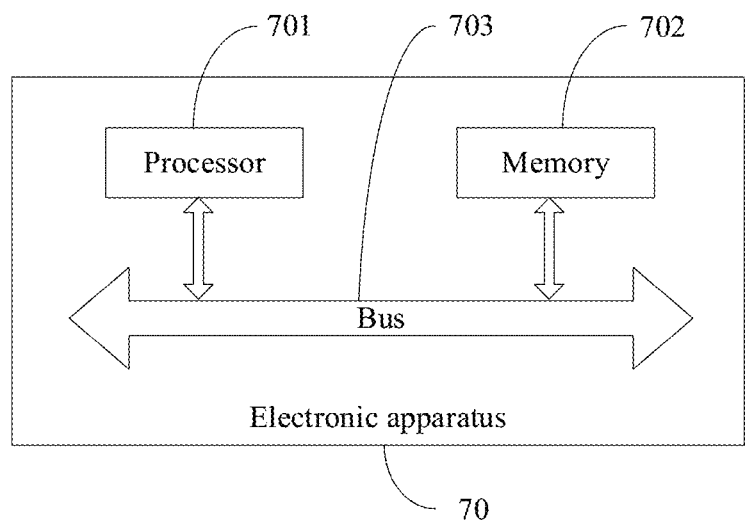
FIG. 7 illustrates a schematic structural diagram of an electronic apparatus according to embodiments of the present disclosure.

Further, embodiments of the present disclosure may provide an electronic apparatus. FIG. 7 illustrates a schematic structural diagram of the electronic apparatus according to embodiments of the present disclosure. As shown in FIG. 7, the electronic apparatus 70 includes at least a processor 701, at least a memory 702 connected to the processor 701, and a bus 703. The processor 701 and the memory 702 may communicate with each other through the bus 703. The memory may be used to store executable instructions of the processor. The processor may be configured to call the program instructions in the memory to execute the above input control method.

The executable program instructions may include, in response to entering the first state, starting the first mode. The first state may be a state requiring input. The executable program instructions may further include receiving the first data sent by the first apparatus. The first data may be the data associated with the first mode.

Embodiments of the present disclosure may be described in a progressive manner. Each embodiment may focus on the differences from other embodiments. The same and similar parts between embodiments may be referred to each other. For the device of embodiments of the present disclosure, since the device corresponds to the method of embodiments of the present disclosure, the description may be relatively simple, and the relevant part may be referred to the description of the method.

In the present disclosure, relational terms such as first and second may be used only to distinguish one entity or operation from another, and may not necessarily require or imply those entities or operations to have such actual relationship or order therebetween. Moreover, the terms "comprising," "including," or any other variation thereof are intended to encompass non-exclusive inclusion such that a process, method, article, or device comprising a series of elements includes not only those elements, but also includes other elements that are not explicitly listed or elements inherent to such a process, method, article, or device. Without further limitation, an element defined by the phrase "including a . . . " does not preclude the presence of additional identical elements in the process, method, article, or device that includes the elements.

The steps of the method or algorithm described in connection with embodiments of the present disclosure may be directly implemented by hardware, a software module executed by the processor, or a combination thereof. The software modules may be stored in random access memory (RAM), internal memory, read-only memory (ROM), electrically programmable ROM, electrically erasable programmable ROM, registers, hard disk, a removable disk, CD-ROM, or any other storage media that is known.

The above description of embodiments of the present disclosure may enable those skilled in the art to implement or use the present disclosure. Various modifications to embodiments of the present disclosure will be apparent to those skilled in the art. The generic principle defined herein may be implemented in other embodiments without departing from the spirit or scope of the present disclosure.

Therefore, the present disclosure may not be limited to embodiments of the present disclosure but conform to the widest scope consistent with the principles and novel features of the present disclosure.

What is claimed is:

1. An input control method comprising:
in response to an electronic device entering a first state, turning on a first mode, the first state being a state requiring text input on a display screen of the electronic device, and turning on the first mode including:
in response to the electronic device entering the first state, controlling a camera of the electronic device to capture an image of a first apparatus, and displaying the image of the first apparatus on the display screen of the electronic device;
sending data to the first apparatus to cause the first apparatus to display, on a screen of the first apparatus, a text input interface and content of context related to the required text input based on the data; and
receiving text data input through and sent by the first apparatus to display the text data on the display screen of the electronic device, the text data being data associated with the first mode, and the text data being input by a user wearing the electronic device and operating the first apparatus based on the image of the first apparatus captured by the camera.

2. The method according to claim 1, wherein turning on the first mode includes:
in response to the electronic device entering the first state, turning on a screen unshielded mode to cause no content to be output on the display screen of the electronic device.

3. The method according to claim 1, further comprising:
in response to detecting that a current display page includes a first object, determining to enter the first state; or
in response to recognizing a data input instruction, determining to enter the first state.

4. The method according to claim 1, wherein:
sending the data to the first apparatus includes:
processing a first content in the current display page into encrypted data and sending the encrypted data to the first apparatus; and
receiving the text data input through and sent by the first apparatus includes:
receiving encrypted text data associated with the text data input through the first apparatus based on the encrypted data.

5. The method according to claim 1, wherein the data received by the first apparatus is data to trigger input from an input device of the first apparatus.

6. The method according to claim 1, further comprising:
in response to detecting that a text input window is displayed on the display screen of the electronic device, determining to enter the first state; or
in response to recognizing an audio instruction, determining to enter the first state.

7. The method according to claim 1, wherein:
the electronic device includes a virtual reality (VR) apparatus or an augmented reality (AR) apparatus; and
the first apparatus includes a mobile phone or a computer.

8. The method according to claim 1, wherein sending the data to the first apparatus includes:
in response to the content of the context related to the required text input indicating a type of the required text input is numeric, sending the data to the first apparatus to cause the first apparatus to display, on the screen of the first apparatus, a numeric keyboard.

9. An input control device comprising:
a mode start module configured to turn on a first mode in response to entering a first state, the first state being a state requiring text input on a display screen of the input control device, wherein the mode start module is further configured to in response to entering the first state, control a camera of the input control device to capture an image of a first apparatus, and display the image of the first apparatus on the display screen of the input control device;
a data transmission module configured to send data to the first apparatus to cause the first apparatus to display, on a screen of the first apparatus, a text input interface and content of context related to the required text input based on the data and
a data reception module configured to receive text data input through and sent by the first apparatus to display the text data on the display screen of the input control device, the text data being data associated with the first mode, and the text data being input by a user wearing the electronic device and operating the first apparatus based on the image of the first apparatus captured by the camera.

10. The device according to claim 9, wherein in response to entering the first state, the mode start module is further configured to:
turn on a screen unshielded mode to cause no content to be output on the display screen of the input control device.

11. The device according to claim 9, wherein the data received by the first apparatus is data to trigger input from an input device of the first apparatus.

12. An electronic apparatus comprising:
a memory storing executable instructions; and
a processor coupled with the memory and, when the instructions are executed, configured to:
in response to entering a first state, turn on a first mode, the first state being a state requiring input text input on a display screen of the electronic device, and turning on the first mode including:
in response to the electronic device entering the first state, controlling a camera of the electronic device to capture an image of a first apparatus, and displaying the image of the first apparatus on the display screen of the electronic device;
send data to the first apparatus to cause the first apparatus to display, on a screen of the first apparatus, a text input interface and content of context related to the required text input based on the data; and
receive text data input through and sent by the first apparatus to display the text data on the display screen of the electronic device, the text data being data associated with the first mode, and the text data being input by a user wearing the electronic device and operating the first apparatus based on the image of the first apparatus captured by the camera.

13. The apparatus according to claim 12, wherein the processor is further configured to:
in response to entering the first state, turn on a screen unshielded mode to cause no content to be output on the display screen of the electronic device.

14. The apparatus according to claim 12, wherein the processor is further configured to:

in response to detecting that a current display page includes a first object, determine to enter the first state; or in response to recognizing a data input instruction, determine to enter the first state.

15. The apparatus according to claim 12, wherein the processor is further configured to:

process a first content in the current display page into encrypted data and send the encrypted data to the first apparatus; and receive encrypted text data associated with the text data input through the first apparatus based on the encrypted data.

16. The apparatus according to claim 12, wherein the data received by the first apparatus is data to trigger input from an input device of the first apparatus.

* * * * *